July 3, 1951  J. H. HOLSTEIN  2,558,753
FEEDING DEVICE FOR SHAKER CONVEYERS
Filed Oct. 25, 1946  3 Sheets-Sheet 1
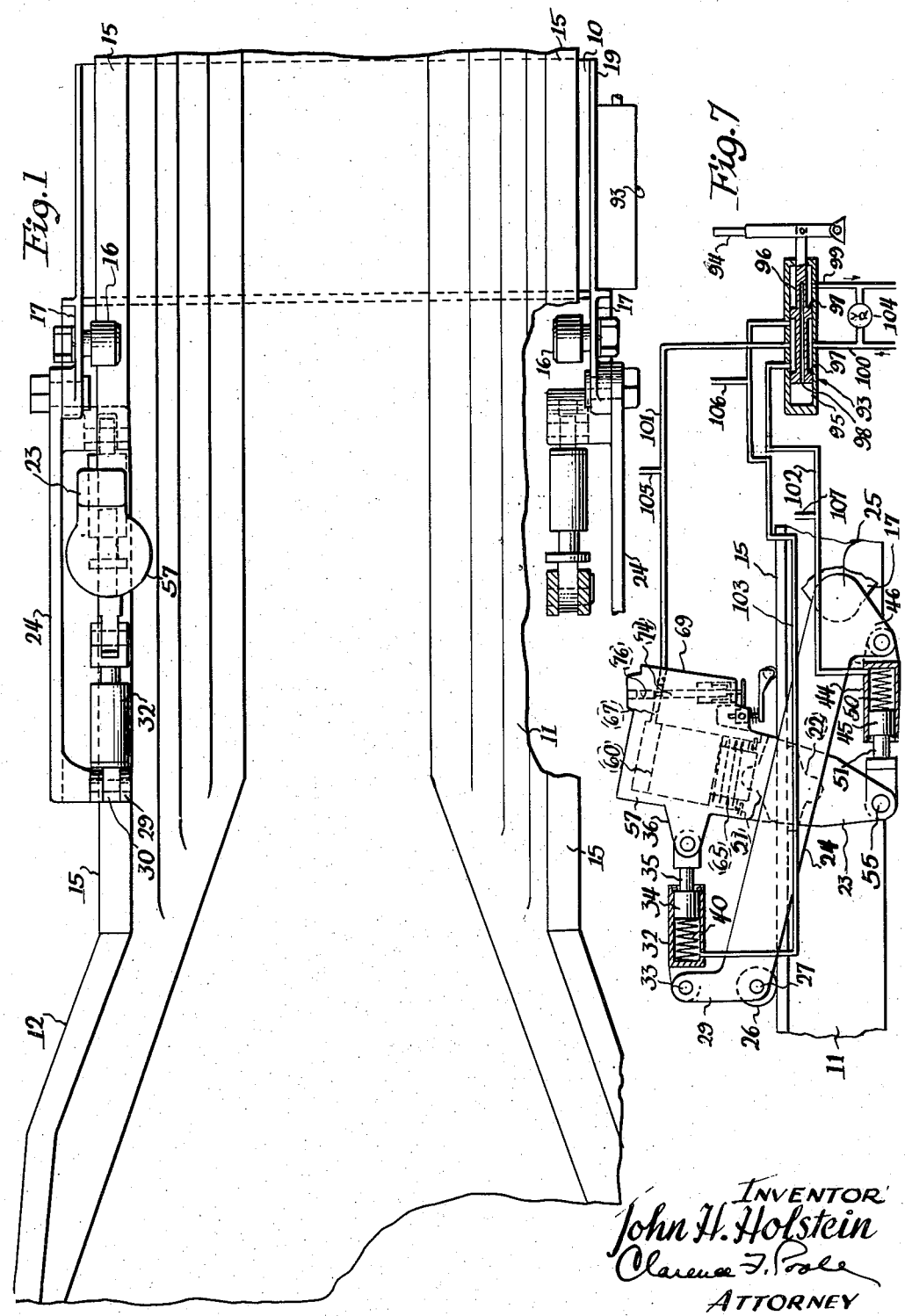
INVENTOR
John H. Holstein
Clarence T. Poole
ATTORNEY July 3, 1951   J. H. HOLSTEIN   2,558,753
FEEDING DEVICE FOR SHAKER CONVEYERS
Filed Oct. 25, 1946   3 Sheets-Sheet 2
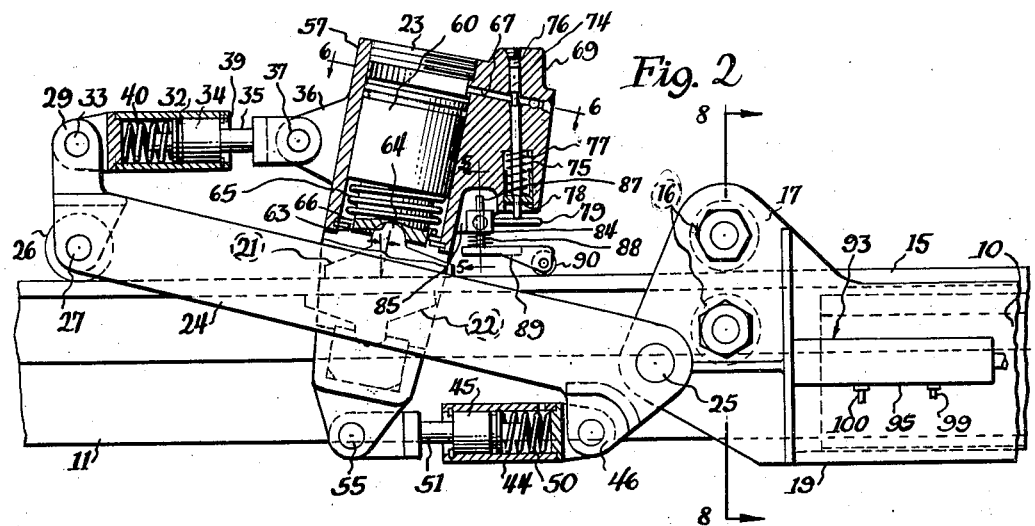
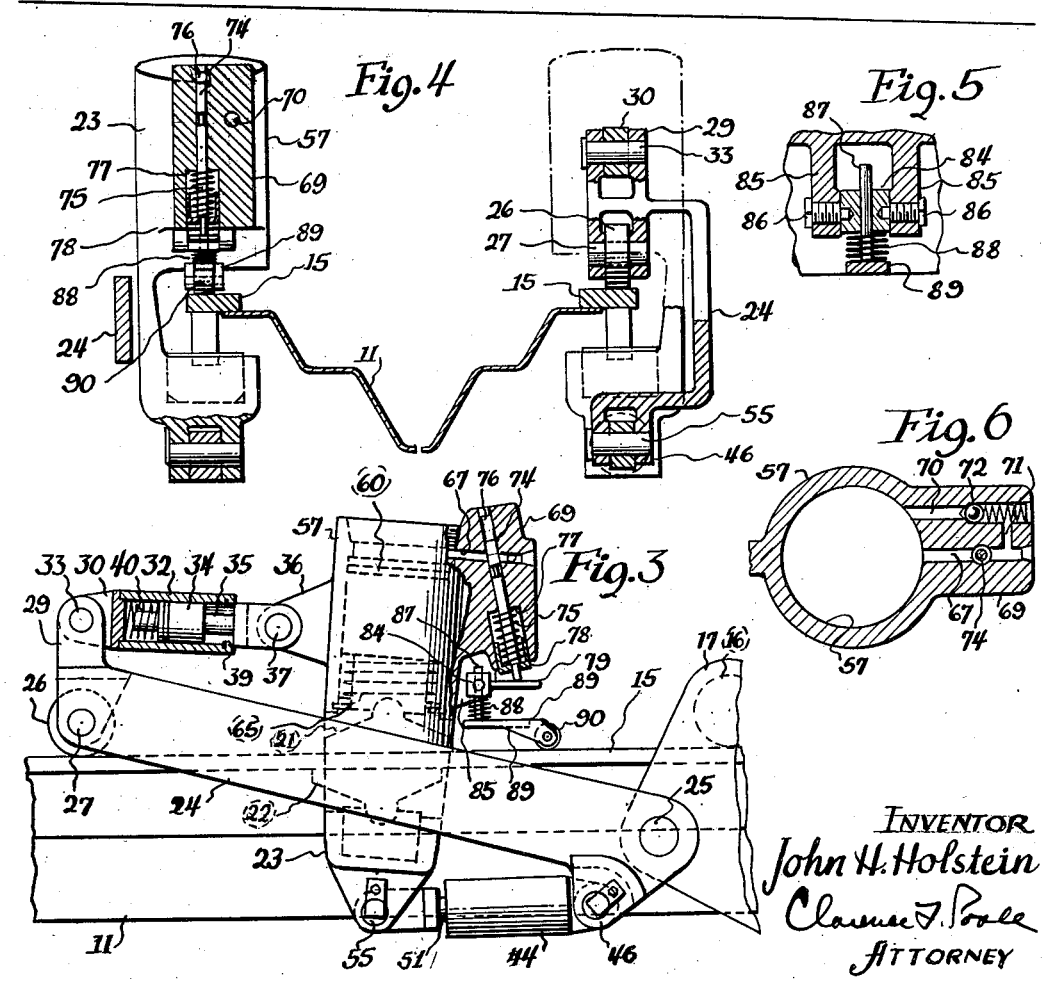
INVENTOR
John H. Holstein
Clarence T. Poole
ATTORNEY July 3, 1951

J. H. HOLSTEIN 2,558,753

FEEDING DEVICE FOR SHAKER CONVEYERS

Filed Oct. 25, 1946

INVENTOR.
John H. Holstein
BY
Clarence F. Poole
ATTORNEY

Patented July 3, 1951

2,558,753

UNITED STATES PATENT OFFICE 2,558,753

FEEDING DEVICE FOR SHAKER CONVEYERS

John H. Holstein, Chicago, Ill., assignor to Goodman Manufacturing Company, Chicago, Ill., a corporation of Illinois Application October 25, 1946, Serial No. 705,560

17 Claims. (Cl. 198—220)

This invention relates to improvements in feeding devices for shaker conveyors, and more particularly relates to a new and improved form of fluid controlled feeding device for extensibly or retractibly moving an extensible trough and shovel of a shaker conveyor trough line by reciprocable movement of the conveyor.

The principal objects of my invention are to provide a novel form of friction grip feeding device for extensibly or retractibly moving an extensible trough of a shaker conveyor including a floating connection between the gripping devices and a reciprocating trough of the conveyor and having fluid operated means arranged to hold said gripping devices in gripping position and to exert forces thereon to engage said gripping devices with the extensible trough during alternate strokes of the conveyor.

A further object of my invention is to provide a fluid operated feeding device for the extensible trough of a shaker conveyor including an inclined carrier member having a cylinder and piston for holding the grip blocks in position to engage and release one trough of the conveyor during alternate strokes of the conveyor and a novel valve arrangement and operating means therefor, for releasing fluid pressure from the cylinder and releasing the friction grip blocks from said one trough of the conveyor when the angle of the carrier member moves from a normal gripping angle to an upright angle due to overload conditions.

Patent No. 2,449,777 issued to me on September 21, 1948, relates to a hydraulically operated feeding device for shaker conveyors. The device of my present invention, however, differs from that of my prior invention in the method of engaging the grip blocks and releasing them upon overload of the feeding device, and in that in the feeding device of my prior filed application, a valve is operated by each stroke of the conveyor to engage the grip blocks with the extensible trough during alternate strokes of the conveyor, while in the device of my present invention the grip blocks are operated by setting a control valve in one operative position or another, making it unnecessary to operate the valve by the reciprocating action of the conveyor.

These and other objects of my invention will appear from time to time as the following specification proceeds and with reference to the accompanying drawings wherein:

Figure 1 is a fragmentary plan view of a feeding device constructed in accordance with my invention, shown as being connected between the reciprocating and extensible troughs of a shaker conveyor, with certain parts of the extensible trough broken away and certain parts of the feeding device shown in horizontal section;

Figure 2 is a view in side elevation of the feeding device shown in Figure 1, with certain parts thereof shown in substantially longitudinal section;

Figure 3 is a view somewhat similar to Figure 2, but showing the parts of the feeding device in a different operative position than in Figure 2;

Figure 4 is an enlarged fragmentary transverse sectional view taken through the feeding device;

Figure 5 is an enlarged fragmentary sectional view taken substantially along line 5—5 of Figure 2;

Figure 6 is an enlarged fragmentary transverse sectional view taken substantially along line 6—6 of Figure 2;

Figure 7 is a diagrammatic view showing the fluid diagram for supplying fluid under pressure to operate the feeding device;

Figure 8:
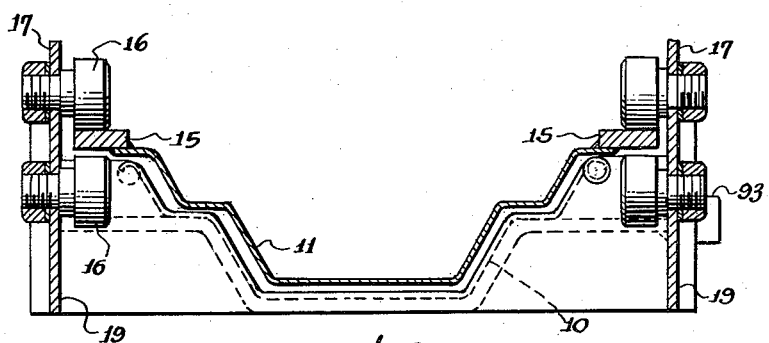
Figure 8 is a transverse sectional view of Figure 2 taken along the line 8—8.
Figure 9:
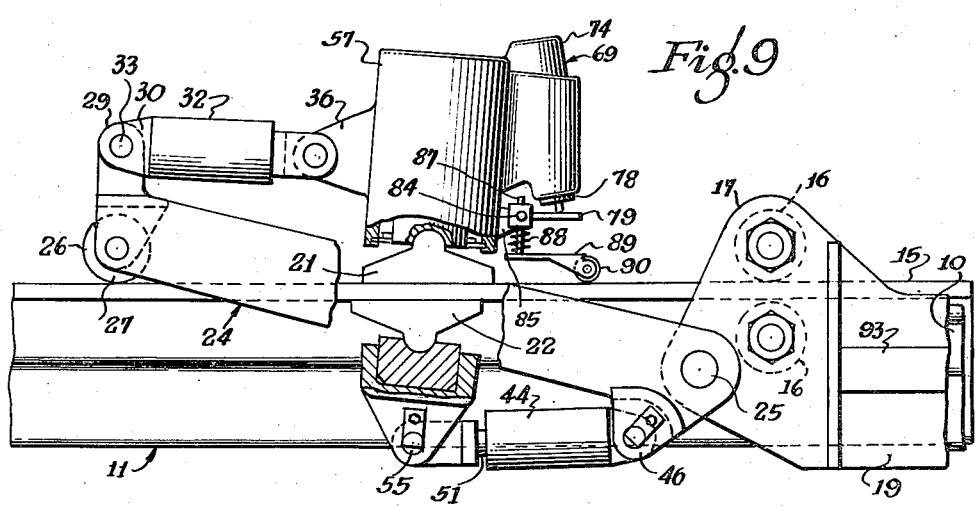
Figure 9 is a view similar to Figure 3 with certain parts cut away to show the grip blocks.

In the drawings, the main elements of the invention illustrated include a reciprocating trough 10 having an extensible trough 11 mounted for extensible or retractible movement with respect thereto. A flared gathering shovel 12 forms a continuation of the forward end of said extensible trough, for picking up loose material from the ground. Said reciprocating trough may be connected to and driven from the inby end of a shaker conveyor trough line through a swivel (not shown), to permit lateral movement of said reciprocating and extensible troughs so as to enable the shovel to pick up loose material from the far corners of a working face of a mine, and to continuously convey material onto the shaker conveyor trough line, in a manner well known to those skilled in the art and no part of my present invention so not herein shown.

The extensible trough 11 is supported on the ground at its forward end on the forward end of the shovel 12 and is supported above the ground at its rear end on a suitable ground engaging bearing shoe in a well known manner, and no part of my present invention so not herein shown. Said extensible trough has bearing plates 15, 15 extending along the upper outer sides thereof and projecting laterally therefrom. Said bearing plates extend between rollers 16, 16 mounted in upwardly and forwardly extending side wall portions 17, 17 of a frame 19, secured to the forward end of the reciprocating trough 10 and extending forwardly of said trough and across the bottom and upwardly along opposite sides thereof. Said rollers form a slidable support for the forward end of said reciprocating trough on said bearing plates and said extensible trough.

The bearing plates 15, 15 are also adapted to be engaged by friction grip blocks 21 and 22 mounted in carrier members 23, 23 and engaging the top and bottom faces of said bearing plates respectively. Said carrier members and the means for engaging said grip blocks with said bearing plates on each side of the extensible trough 11 are of a similar construction so a description of said feeding mechanism for one side of said extensible trough will be sufficient for both sides thereof.

A forwardly extending upwardly inclined connecting frame 24 is pivotally connected to the forward end of the side wall 17 on a pivotal pin 25 and extends forwardly from said side wall. The forward end of said frame is supported on a roller 26 adapted to ride on the top of the bearing plate 15 and mounted at the forward end of said connecting frame on a pin 27. A bifurcated connecting bracket 29 extends upwardly from the forward end of said connecting frame just above the roller 26. An ear 30 projecting forwardly from the head end of a cylinder 32 extends between the furcations of said bracket and is pivotally connected thereto by a pivotal pin 33. A piston 34 is slidably movable within said cylinder and has a piston rod 35 extensible therefrom, which is pivotally connected to an ear 36 projecting forwardly from the carrier member 23, by means of a pivotal pin 37. Said piston is retained within said cylinder by a spring retaining ring 39. A compression spring 40 is interposed between the inside of the head end of said cylinder and said piston, to urge said piston towards the outer end of said cylinder.

A cylinder 44 having a piston 45 movable therein is connected between the lower end of the carrier member 23 and a connecting bracket 46 depending from the rear portion of the connecting frame 24. Said cylinder and piston are like the cylinder 32 and piston 34, and are connected between said connecting frame and carrier member in a manner similar to which said cylinder 32 and piston 34 are connected between said connecting frame and carrier member, so a detailed description thereof is not necessary, except to point out that a compression spring 50 urges said piston towards the outer end of said cylinder and a piston rod 51 extends from said cylinder and piston and is pivotally connected to said carrier member by means of a pivotal pin 55.

A cylinder 57 is herein shown as being formed integrally with the portion of the carrier member 23 disposed above the bearing plate 15. A piston 60 having a reduced depending portion 61 is slidably mounted in said cylinder and serves to hold the grip blocks 21 and 22 in position to grip the bearing plate 15 at the beginning of a feeding stroke of the conveyor. The lower end of said depending portion of said piston has a concave semi-spherical socket 63, which is adapted to receive an arcuate boss 64 projecting upwardly from the upper grip block 21.

The piston 60 is urged towards the head end of the cylinder 57 by a compression spring 65 encircling the depending portion 61 of said piston and interposed between said piston and a retaining ring 66, mounted in the lower end of said cylinder. A pressure passageway 67 extends into the upper or head end of said cylinder through a block 69, herein shown as being formed integrally with said cylinder and extending rearwardly therefrom. A by-pass passageway 70 extends from said cylinder through said block, in parallel relation with respect to the pressure passageway 67. Said by-pass passageway is connected with said pressure passageway by means of a cross passageway 71 disposed adjacent the outer or rear side of said block. A check valve 72 of a well known form of spring pressed ball type is provided in said by-pass passageway to prevent the passage of fluid into said by-pass passageway from the pressure passageway 67. Said check valve is herein shown as being a well known form of spring pressed ball type of check valve.

A piston valve 74 is provided to block the passage of fluid under pressure into the head end of the cylinder 57 when the carrier member 23 moves into an upright position due to overload conditions on the feeding mechanism, and to prevent operation of the grip blocks when in such a position, and thus to limit the action of said cylinder when said carrier member is pivoted upwardly beyond a predetermined angle. Said piston valve is slidably mounted in a valve chamber 76 formed in the block 69 and extending downwardly through said block and intersecting the pressure passageway 67. Upon movement of said piston valve downwardly along said passageway, effected by a compression spring 75, said piston valve will block the passage of fluid through said pressure passageway 67 and permit fluid to be released through the by-pass passageway 70 and check valve 72, when the pressure of fluid in the head end of the cylinder 57 is greater than the pressure of the fluid in the pressure passageway 67, on the inlet side of said piston valve.

The spring 75 encircles the lower portion of the piston valve 74 and is mounted in an enlarged lower portion of the valve chamber 76 and tends to depress said piston valve in said valve chamber. Said spring abuts a shouldered portion 77 of said enlarged lower portion of said chamber at one of its ends and abuts the inside of the bottom of a cylindrical guide and retaining member 78 at its opposite end. Said guide and retaining member is slidably mounted in the lower portion of said valve chamber and is suitably secured to the stem of said piston valve, as by brazing or welding. Operation of said piston valve 74 is controlled by a rocking arm 79, which is engaged by the end of the stem of said piston valve, by means of the compression spring 75.

The rocking arm 79 is secured to and extends from a block 84 transversely pivoted between two spaced ears 85, 85 extending rearwardly from the carrier member 23 just beneath the valve block 69. Two pivotal pins 86, 86 are threaded through said ears and have pivotal bearing engagement at their inner ends with said block and pivotally mount said block between said ears. Said block is drilled in a direction perpendicular to said rocking arm and has a plunger 87 slidably mounted in the drilled portion thereof. A compression spring 88 encircles the lower portion of said plunger and is interposed between the bottom of said block and the upper side of a rider arm 89 secured to the lower end of said plunger. A roller 90 is mounted adjacent the rear end of said rider arm and rides along the top surface of the bearing plate 15 and is held in engagement therewith by means of the spring 88.

When the carrier member 23 is in the rearwardly inclined position shown in Figure 2, the rocking arm 79 engaging the lower end of the stem of the piston valve 74, will move said piston valve against the compression spring 75 to fully open the pressure passageway 67 to the passage of fluid into the cylinder 57. Upon overload conditions as when the forward end of the shovel 12 engages an obstruction on the ground during the forward strokes of the conveyor, the grip blocks 21 and 22 engaging the bearing plate 15 will tend to pivot the carrier member 23 in a counterclockwise direction into the position shown in Figure 3. When this occurs the arm 79 will pivot downwardly about the pivotal pins 86, 86 and the spring 75 will depress the piston valve 74 and close the pressure passageway 67, to prevent fluid under pressure from entering said cylinder and to permit fluid to be released from said cylinder through the relief passageway 70 and check valve 72, when the pressure in the passageway 70 exceeds pressure in the pressure line supplying fluid under pressure to the pressure passageway 67. This will release the grip blocks 21 and 22 from the bearing plate 15 so the reciprocating trough 10 may move along the extensible trough 11 until the overload conditions are relieved.

A valve 93 operated by a hand lever 94 is provided to control the admission and release of fluid under pressure to and from the cylinders 32, 44 and 57 (see Figure 7). Said valve, as herein shown, includes a valve block 95 having a valve piston 96 slidably mounted therein. Said valve block and hand lever may be suitably mounted on the outer side of a side wall 17 of the frame 19.

The valve piston 96 has two spaced lands 97, 97 and is drilled along its center, as indicated by reference character 98, to permit the discharge of fluid under pressure from the left-hand side of said valve piston through a return line 99, disposed adjacent the right-hand end of said valve block. Pressure is admitted to said valve block between the lands 97, 97 through a pressure line 100. A pressure line 101 is shown as leading from the central portion of said valve block between the lands 97, 97 to the pressure passageway 67, for supplying fluid under pressure to the cylinder 57. A pressure line 102 leads from said valve block, adjacent the inside of the left-hand land 97, when said valve is in the central position shown in Figure 7, to the head end of the cylinder 44 to supply fluid under pressure thereto. A pressure line 103 is connected from said valve block, to the right of the pressure line 101, to the head end of the cylinder 32 to supply fluid under pressure thereto.

A relief valve 104 is connected between the pressure line 100 and the return line 99 to by-pass pressure to said return line, when overload conditions are reached, as when the forward end of the shovel 12 engages an obstruction on the ground, to relieve fluid pressure from the cylinders 32, 44 and 57.

The pressure lines 101, 102 and 103, on one side of the extensible trough 11, may be connected to corresponding pressure lines on the opposite side of said extensible trough to supply fluid under pressure to operate the grip blocks 21 and 22 on the opposite side of said extensible trough from that just described, through pressure lines 105, 106, and 107, respectively. Also a valve like the valve 93 may be provided on each side of the reciprocating trough, to permit the operation and control of the feeding device from either side of said reciprocating and extensible troughs.

When the valve 93 is in the position shown in Figure 7, fluid under pressure will be supplied to the cylinders 32, 44 and 57. This will hold the carrier member 23 from pivotal movement about either of its ends and will engage the grip blocks 21 and 22 with the bearing plate 15 during both the forward and return strokes of the conveyor, to reciprocably move the extensible trough with the reciprocating trough and cause material on said extensible trough to move along said extensible trough into said reciprocating trough.

If, however, the shovel 12 should engage an obstruction on the ground during the forward strokes of the conveyor with greater force than the force exerted on the opposite ends of the carrier member 23 by the pistons 34 and 45, said carrier member will pivot in a counterclockwise direction until the valve 74 blocks the passage of fluid under pressure to the cylinder 57, and fluid will be released from said cylinder past the check valve 72, and relief valve 104, permitting the spring 65 to positively release said grip blocks from said bearing plate.

When the hand lever 94 is in a forwardly inclined position, fluid under pressure will be supplied to the head end of the cylinder 44 through the pressure line 102 and to the head end of the cylinder 57 through the pressure line 101. Fluid will also be released from the head end of the cylinder 32 through the pressure line 103. This will cause a force to be exerted on the lower end of the carrier member 23 through the cylinder 44 and piston 45 during the forward strokes of the conveyor in a direction to engage the grip blocks 21 and 22 with the bearing plate 15, and move the extensible trough with the reciprocating trough during the forward strokes of the conveyor. During the return strokes of the conveyor said cylinder and piston will exert a force on the lower end of said carrier member in an opposite direction and tend to pivot said carrier member in a counterclockwise direction to release said grip blocks from and extensibly move said extensible trough with respect to said reciprocating trough.

When the hand lever 94 is moved to a rearwardly inclined position, fluid under pressure will be admitted to the head end of the cylinder 57 through the pressure line 101, and to the head end of the cylinder 32 through the pressure line 103. Fluid will also be released from the cylinder 44 through the pressure line 102. The cylinder 32 and piston 34 will then exert a force on the upper end of the carrier member 23 during the return strokes of the conveyor, to tend to pivot said carrier member in a clockwise direction and positively engage the grip blocks 21 and 22 with the bearing plate 15, to move the extensible trough 11 rearwardly with the reciprocating trough 10. During the forward strokes of the conveyor said piston and cylinder will exert a pulling force on the upper end of said carrier member and tend to pivot said carrier member in a counterclockwise direction and positively release said grip blocks from said bearing plate. This will cause retractible movement of said extensible trough with respect to said reciprocating trough.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding device for shaker conveyors, a reciprocating trough, an extensible trough, and means for moving said extensible trough relative to said reciprocaitng trough including two friction grip blocks reciprocably moved by one of said troughs and engageable with the other of said troughs along the edges thereof during alternate strokes of the conveyor, a vertically inclined carrier member mounted on each side of said extensible trough for said grip blocks, a connecting frame pivotally connected to said one trough and extending in advance thereof, floating connections from opposite ends of said frame to opposite ends of said carrier member, and fluid pressure means at one end of said carrier member for urging said grip blocks in a direction to engage said other trough.

2. In a feeding device for shaker conveyors, a reciprocating trough, an extensible trough, and means for moving said extensible trough relative to said reciprocating trough including two friction grip blocks reciprocably moved by one of said troughs and engageable with the other of said troughs along the edges thereof during alternate strokes of the conveyor, a vertically inclined carrier member mounted one each side of said other trough for said grip blocks, fluid pressure means at one end of said carrier member for urging said grip blocks in a direction to engage said other trough, a connecting frame pivotally connected to said one trough and extending in advance thereof, yieldable connections from said frame to opposite ends of said carrier member and fluid pressure means associated with said yieldable connections having control valve means therefor for rendering either of said yieldable connections relatively solid, to cause a force to be exerted on said carrier member to engage said grip blocks with said other trough during alternate strokes of the conveyor.

3. In a feeding device for shaker conveyors, a reciprocating trough, an extensible trough, and means for moving said extensible trough relative to said reciprocating trough including two friction grip blocks reciprocably moved by one of said troughs and engageable with the other of said troughs during alternate strokes of the conveyor, a vertically inclined carrier member for said grip blocks mounted along the edges of said extensible trough, fluid pressure means at one end of said carrier member for urging said grip blocks in a direction to engage said other trough, a frame pivotally connected to said one trough and extending in advance thereof, and fluid pressure cylinders and pistons connecting said frame with opposite ends of said carrier member and selectively operable to exert a force on either end of said carrier member in directions to engage said extensible trough upon the admission of fluid under pressure thereto.

4. In a feeding device for shaker conveyors, a reciprocating trough, an extensible trough, and means for moving said extensible trough relative to said reciprocating trough including two friction grip blocks reciprocably moved by one of said troughs and engageable with the other of said troughs during alternate strokes of the conveyor, a vertically inclined carrier member for said grip blocks, fluid pressure means at one end of said carrier member for urging said grip blocks in a direction to engage said other trough, a connecting frame pivotally connected to said one trough and extending in advance thereof, yieldable connections from opposite ends of said connecting frame to opposite ends of said carrier member, fluid operated means selectively operable to render either or both of said yieldable connections relatively rigid, and control valve means effective to selectively operate said fluid operated means to effect extension or retraction of said extensible trough, or to cause reciprocable movement of said extensible trough with said reciprocating trough.

5. In a feeding device for shaker conveyors, a reciprocating trough, an extensible trough, and means for moving said extensible trough relative to said reciprocating trough including two friction grip blocks reciprocably moved by one of said troughs and engageable with the other of said troughs during alternate strokes of the conveyor, a vertically inclined carrier member for said grip blocks, a fluid pressure means at one end of said carrier member operable to hold said grip blocks in position to engage said other trough, a connecting frame pivotally connected to said one trough, and yieldable connections from said connecting frame to opposite ends of said carrier member including two fluid operated cylinders and pistons and valve means selectively operable to supply fluid under pressure to either or both of said cylinders to render either or both of said connections relatively solid and exert forces on said carrier member during alternate strokes of the conveyor to engage said grip blocks with said other trough, to effect extension or retraction of said extensible trough or to effect reciprocable movement of said extensible trough with said reciprocating trough.

6. In a feeding device for shaker conveyors, a reciprocating trough, an extensible trough, and means for moving said extensible trough relative to said reciprocating trough including two friction grip blocks reciprocably moved by one of said troughs and engageable with the other of said troughs during alternate strokes of the conveyor, a vertically inclined carrier member for said grip blocks, a fluid pressure cylinder and piston at one end of said carrier member operable to hold said grip blocks in position to engage said other trough, a connecting frame pivotally connected to said one trough, and yieldable connections from said connecting frame to opposite ends of said carrier member including two other fluid operated cylinders and pistons, spring means for urging said other pistons in extended positions with respect to their cylinders, and control valve means selectively operable to supply fluid under pressure to either or both of said last mentioned cylinders, to render either or both of said connections relatively solid and exert forces on said carrier member during alternate strokes of the conveyor to positively engage said grip blocks with said other trough, to effect extension or retraction of said extensible trough or to effect reciprocable movement of said extensible trough with said reciprocating trough.

7. In a feeding device for shaker conveyors, a reciprocating trough, an extensible trough, and means for moving said extensible trough relative to said reciprocating trough including two friction grip blocks reciprocably movable with said reciprocating trough and engageable with said extensible trough during alternate strokes of the conveyor, an inclined carrier member for said grip blocks, connections from opposite ends of said carrier member to said reciprocating trough operable to exert forces on one end or the other of said carrier member to engage said grip blocks with said extensible trough during alternate strokes of the conveyor, to extensibly or retractibly move said extensible trough with respect to said reciprocating trough, and a fluid pressure cylinder and piston at one end of said carrier member operable to hold said grip blocks in position to engage said extensible trough, valve means for supplying fluid under pressure to said cylinder, and means operable upon the changing of the angle of inclination of said carrier member from a normal inclined position towards the vertical due to overload conditions, to cause said valve means to block the flow of fluid to said cylinder, and to permit the release of fluid from said cylinder, to cause the positive release of said grip blocks when the forward end of said extensible trough engages an obstruction on the ground during a forward stroke of the conveyor.

8. In a feeding device for shaker conveyors, a reciprocating trough, an extensible trough, and means for moving said extensible trough relative to said reciprocating trough including two friction grip blocks reciprocably movable with said reciprocating trough and engageable with said extensible trough during alternate strokes of the conveyor, an inclined carrier member for said grip blocks, connections from opposite ends of said carrier member to said reciprocating trough selectively operable to exert forces on one end or the other of said carrier member to engage said grip blocks with said extensible trough during alternate strokes of the conveyor, to extensibly or retractibly move said extensible trough with respect to said reciprocating trough, and a fluid pressure cylinder and piston at one end of said carrier member operable to hold said grip blocks in position to engage said extensible trough, valve means for supplying fluid under pressure to said cylinder, and a rocking arm transversely pivoted to said carrier member and having operative connection with said valve means to cause said valve means to move to a position to block the flow of fluid to said cylinder and to permit the release of fluid therefrom, to cause the positive release of said grip blocks from said extensible trough when the forward end of said extensible trough engages an obstruction on the ground, and the angle of said carrier member changes from a normal inclined position towards a vertical position due to overload conditions on said carrier member.

9. In a feeding device for shaker conveyors, a reciprocating trough, an extensible trough, and means for moving said extensible trough relative to said reciprocating trough including two friction grip blocks reciprocably movable with said reciprocating trough and engageable with said extensible trough during alternate strokes of the conveyor, an inclined carrier member for said grip blocks, connections from opposite ends of said carrier member to said reciprocating trough selectively operable to exert forces on one end or the other of said carrier member to engage said grip blocks with said extensible trough during alternate strokes of the conveyor, to extensibly or retractibly move said extensible trough with respect to said reciprocating trough, and a fluid pressure cylinder and piston at one end of said carrier member operable to hold said grip blocks in position to engage said extensible trough, valve means for supplying fluid under pressure to said cylinder, means operable upon the changing of the inclination of said carrier member to cause said valve means to block the flow of fluid under pressure to said cylinder, and to permit the release of fluid from said cylinder, to cause the positive release of said grip blocks when the forward end of said extensible trough engages an obstruction on the ground, and means for operating said valve means including a rocking arm transversely pivoted to said carrier member and having operative connection with said valve means, other means having engagement with said extensible trough and operative connection with said rocking arm for rocking said arm as the angle of said carrier member changes from a normal inclined position towards the vertical due to overload conditions on said carrier member.

10. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a connecting frame for reciprocably moving said carrier member and grip blocks with the conveyor, yieldable connections from said connecting frame to opposite ends of said carrier member including two fluid operated cylinders and pistons, and means selectively operable to supply fluid under pressure to said cylinder and piston at one end of said carrier member and to simultaneously supply fluid under pressure to either or both of said last mentioned cylinders to hold said grip blocks in position to grip said extensible trough and to render either or both of said yieldable connections relatively solid to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough.

11. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid to exert forces on said carrier member to positively engage said grip blocks with said extensible trough during alternate strokes of the conveyor to effect extension or retraction of said extensible trough, or to engage said grip blocks with said extensible trough during both strokes of the conveyor to effect reciprocable movement of said extensible trough with said reciprocating trough, and valve means for limiting the action of said cylinder and piston on said carrier member and permitting release of said grip blocks from said extensible trough when the angle of said carrier member changes from a normal inclined position through a predetermined angle towards the vertical due to overload conditions.

12. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid, to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough, valve means for limiting the action of said cylinder and piston on said carrier member and causing release of said grip blocks from said extensible trough when the angle of said carrier member changes from a normal inclined position through a predetermined angle towards the vertical, an arm operatively connected with said valve means and transversely pivoted to said carrier member and operated upon angular movement of said carrier member with respect to said extensible trough due to overload conditions, to cause operation of said valve means.

13. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid, to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough, valve means for limiting the action of said cylinder and piston on said carrier member and causing release of said grip blocks from said extensible trough when the angle of said carrier member changes from a normal inclined position through a predetermined angle towards the vertical due to overload conditions, a rocking arm operatively connected with said valve means and transversely pivoted to said carrier member, and another arm operatively connected with said rocking arm and having yieldable engagement with said extensible trough, for rocking said rocking arm and to cause operation of said valve means upon angular movement of said carrier member with respect to said extensible trough.

14. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid, to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough, valve means operable to admit fluid under pressure to said first mentioned cylinder and to block the passage of fluid under pressure to said cylinder and permitting fluid to be released from said cylinder, to limit the action of said cylinder when the angle of said carrier member changes from a normal inclined position through a predetermined angle towards the vertical, due to overload conditions.

15. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid, to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough, valve means operable to admit fluid under pressure to said first mentioned cylinder and to block the passage of fluid under pressure to said cylinder and permitting fluid to be released from said cylinder, to limit the action of said cylinder when the angle of said carrier member changes from a normal inclined position through a predetermined angle towards the vertical, due to overload conditions, a rocking arm for operating said valve means, and means yieldably engaging said extensible trough and having operative connection with said arm, for pivotally moving said arm to cause operation of said valve means upon angular movement of said carrier member with respect to said extensible trough.

16. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid, to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough, a valve in said carrier member operable to admit fluid under pressure to said first mentioned cylinder and to block the passage of fluid under pressure to said cylinder, another valve to permit the release of fluid under pressure from said cylinder when said first mentioned valve blocks the passage of fluid under pressure thereto, said valves being operable to limit the action of said cylinder when the angle of said carrier member changes from a normal inclined position through a predetermined angle towards the vertical, due to overload conditions.

17. In a feeding device for shaker conveyors and in combination with an extensible trough, means for moving said extensible trough relative to said conveyor including two friction grip blocks engageable with said extensible trough during alternate strokes of the conveyor, an inclined carrier member for said grip blocks, a fluid pressure cylinder and piston at one end of said carrier member for urging said grip blocks into position to engage said extensible trough, a floating connecting frame for reciprocably moving said carrier member and grip blocks with the conveyor, yieldable connections from said connecting frame to opposite ends of said carrier member including two fluid operated cylinders and pistons, means selectively operable to supply fluid under pressure to said first mentioned cylinder and to simultaneously supply fluid under pressure to either or both of said last mentioned cylinders to hold said grip blocks in position to grip said extensible trough and to render either or both of said yieldable connections relatively solid, to exert forces on said carrier member to positively engage said grip blocks with said extensible trough during alternate strokes of the conveyor, to effect extension or retraction of said extensible trough, or to engage said grip blocks with said extensible trough during both strokes of the conveyor to effect reciprocable movement of said extensible trough with said reciprocating trough, a valve in said carrier member operable to admit fluid under pressure to said first mentioned cylinder and to block the passage of fluid under pressure to said cylinder, another valve to permit the release of fluid under pressure from said cylinder when said first mentioned valve blocks the passage of fluid under pressure thereto, said valves being operable to limit the action of said cylinder when the angle of said carrier member changes from a normal inclined position through a predetermined angle towards the vertical, due to overload conditions, a rocking arm pivotally mounted in said carrier member for operating said first mentioned valve, and means yieldably engaging said extensible trough and slidably movable therealong for pivotally moving said rocking arm to operate said valve means upon angular movement of said carrier member with respect to said extensible trough beyond a predetermined angle.

JOHN H. HOLSTEIN.

REFERENCES CITED

The following references are of record in the file of this patent:

UNITED STATES PATENTS

| Number | Name | Date |
|---|---|---|
| Re. 22,209 | Bergmann | Oct. 27, 1942 |
| 2,404,058 | Hagenbook | July 16, 1946 |